Nov. 24, 1959     W. F. DOUBLE     2,913,928
FLUID LOCK DIFFERENTIAL
Filed June 12, 1957
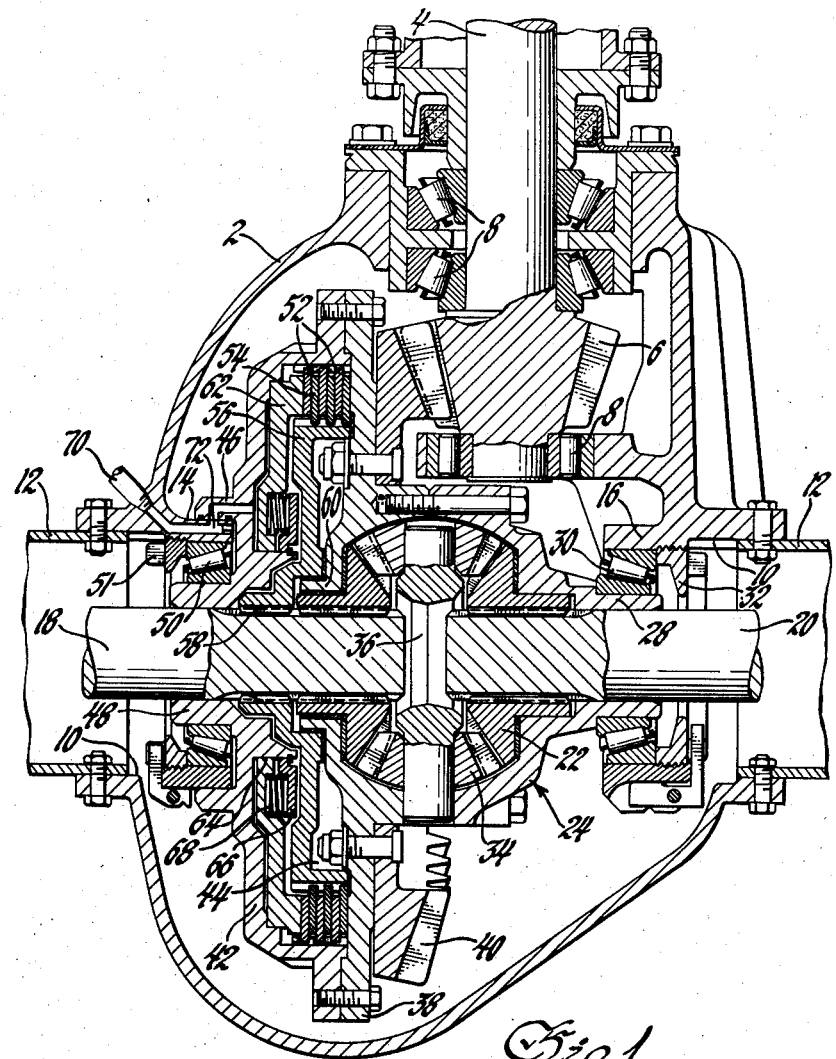
INVENTOR.
Walter F. Double
BY
R. F. Barnard
ATTORNEY

United States Patent Office 2,913,928
Patented Nov. 24, 1959

2,913,928

FLUID LOCK DIFFERENTIAL

Walter F. Double, Chagrin Falls, Ohio, assignor to General Motors Corporation, Detroit, Mich., a corporation of Delaware Application June 12, 1957, Serial No. 665,321

6 Claims. (Cl. 74—710.5)

The present invention relates to differentials and, more specifically, to fluid lock differentials for use particularly in heavy duty off-the-road earth-moving equipment.

To equip heavy duty material handling vehicles, such as large capacity trucks, scrapers and the like, with a conventional differential or final drive construction offers serious disadvantages when the vehicle operates in unstable soil conditions, which is the usual case. While the usual differential action is desirable in these vehicles, loss of drive and tractive effort from one of the wheels also results, perhaps for only short intervals of time, as the vehicle traverses soil which is wet or otherwise rendered unstable. Under such circumstances, for example, one drive wheel may pass over a slippery surface thereby resulting through the action of the differential in this wheel taking all of the power input resulting in spinning of the latter and at least momentary complete loss of traction. Since such conditions frequently occur, and particularly in such vehicles as herein specifically contemplated, it is desirable to provide a differential which can be selectively locked to transmit power equally to all wheels mounted on the axle shaft.

It is therefore a feature and object of the present invention to provide a differential construction comprising differential gears supplying the usual differential action, but which differential may be selectively locked to transmit equal power to all wheels mounted on the drive axle.

Moreover, a feature of this invention resides in providing a fluid-actuated multiple disc clutch which is selectively energizable to lock the aforementioned differential.

According to another feature of this invention, the differential construction herein contemplated is not of inordinate size and may be easily mounted in existing housings normally employed with the heavy duty equipment aforementioned.

A still more specific feature and object of this invention is to provide a novel bearing means for supporting the differential within its housing in such a manner as to absorb all the usual thrusts induced therein while permitting the mounting of a multiple disc fluid-actuated clutch within the housing without materially enlarging the latter, if at all.

In general, these and other features of this invention are attained in a conventional type of differential comprising a differential cage having rotatably journalled therein a plurality of differential pinions, oppositely disposed face or side gears in mesh with the differential pinions and secured to coaxial outwardly projecting wheel-driving axle shafts, a multiple disc clutch including clutch elements secured, respectively, for rotation with the differential cage and with one of the wheel-driving axle shafts, fluid-operated piston means being provided for selective engagement of the clutch elements to lock the one wheel-driving axle shaft and its face gear to the differential pinions thereby locking the differential.

These and other features, objects and advantages of this invention will appear more fully hereinafter as the description of the invention proceeds, and in which reference is made to the following drawing in which:

Figure 1 is a cross section of the fluid lock differential of this invention; and Figure 2 is a schematic representation of the fluid system for controlling the differential of Figure 1.

Referring now to the drawing, and particularly Figure 1, there is shown a differential housing 2 through the forward end of which a drive shaft 4 projects and on the inner end of which there is secured a bevel pinion 6. The shaft 4 is suitably journalled in the roller bearings 8 as clearly shown in Figure 1. Oppositely disposed openings 10 are formed in the differential housing 2 and the axle housings 12 project outwardly therefrom. The housing 2 includes axially inwardly directed annular pilot portions 14 and 16 for a purpose which will appear more fully hereinafter.

The coaxial wheel-driving axle shafts 18 and 20 extend through the axle housings 12 into the interior of the housing 2. Each shaft has a bevel face or side gear 22 splined or otherwise suitably secured thereon. A differential cage 24 includes an annular axially outwardly extending support portion 28 closely surrounding the axle shaft 20 outboard of its face gear. A plurality of roller bearing elements 30 are interposed between the cage support portion 28 and the pilot portion 16 of the housing 2 thereby supporting this end of the differential cage and axle shaft 20. A nut 32 is threadably received within the opening 10 in the housing to adjust the position of the bearing members 30. Suitable bearing washers are provided between the inner wall of the differential cage 24 and the mating surfaces of the face gears 22 as clearly shown in Figure 1. The usual differential bevel gears 34 are rotatably journalled on a spider member 36 secured within the differential cage and engage the face gears 22.

The differential cage includes an annular flange 38 to which the ring gear 40 is bolted. As is usual, the ring gear is in mesh with the drive pinion 6. The annular cage flange 38 is spaced from and forms with the annular wall 42 a clutch housing 44 as will appear more fully hereinafter. The annular wall includes an annular axially projecting flange 46 in bearing engagement with the pilot portion 14 of the differential housing, and another support or bearing portion 48 surrounding the axle shaft 18 and in substantial radial alignment with pilot portion 14. Anti-friction bearing elements 50 are disposed between the pilot portion 14 and the support portion 48 of the clutch housing wall 42, a threaded bearing adjustment nut 51 again being provided.

A multiple disc fluid-actuated clutch is disposed within the housing 44 and comprises a plurality of annular discs or plates 52 splined to the wall 42 adjacent the flange 38 for rotation with the latter. A group of similar discs 54 are splined to the annular clutch plate 56 having its inner periphery 58 splined or otherwise suitably secured to the axle shaft 18. The clutch plate 56 has annular shoulder portions 60 piloted on the adjacent surfaces of the differential cage 24, suitable annular bearing means being disposed between the clutch plate and the adjacent differential cage. An annular piston 62 is piloted on the axially inwardly directed shoulder 64 of the wall member 42 and is adapted to be actuated by fluid pressure to apply the multiple disc clutch. Although it has been found not to be entirely necessary, an annular spring retainer plate 66 may be secured on the shoulder 64 by such as a snap ring, and a spring 68 interposed between this plate and the annular piston normally acting to back the latter off of the multiple disc clutch plates.

A fluid inlet port 70 is formed in the wall of the differential housing and is in communication with the pressure chamber between the piston 62 and the wall member 42 through a conduit 72 formed through the pilot portion 14 and the wall member 42.

Referring now to Figure 2, there is shown a pressure tank 74 containing a suitable fluid under pressure adapted to be supplied through the conduit 76 and manually controlled valve 78 to the port 70 for applying the clutch piston. The valve includes an exhaust port 80 which may be utilized to dump fluid to atmosphere where air is employed, or may be suitably connected to the pressure tank if a hydraulic liquid is employed. Inasmuch as the heavy duty type of vehicle for which this invention is specifically intended may employ air or hydraulic brakes, the fluid for actuating the clutch may be supplied from either of these systems as will be apparent to those skilled in the art.

In operation, drive will be transmitted through the drive line shaft 4 to the interior of the differential housing to rotate the ring gear 40 and with it the differential cage 24. With the piston 62 normally disengaged, conventional differential action will occur. However, if the vehicle operator encounters conditions resulting in sporadic or sustained loss of traction and drive, he may adjust the valve 78 to the position shown in Figure 2, at which time, fluid under pressure will apply the clutch. At this time, the ring gear 40 will be locked to the axle shaft 18 through the clutch elements 52 and 54. Since the ring gear is operatively connected to the differential pinions 34 and the face gear 22 is secured to the shaft 18 and in mesh with the differential pinions, the entire differential will be locked, thereby supplying power through both axle shafts.

It will be noted that the right hand portion of the differential cage as viewed in Figure 1 and including the support portion 28 is mounted within the differential housing in a more or less conventional manner. On the other hand, the other end of the differential cage is supported in an entirely different manner in view of the fact that provision has been made for the insertion of the multiple disc clutch elements. In this regard, it will be noted that the other end of the differential cage is supported through the wall member 42 and, particularly, the axially outwardly directed portions 46 and 48 seating, respectively, on the pilot portion 14 and axle shaft 18. The latter axially outwardly directed portion 48 of the wall member 42 is seated beneath the circumferentially disposed bearing elements 50 to complete the mounting of the differential cage. Such a mounting of the differential cage has been found to provide the necessary bearing support to resist thrust imposed upon the differential construction by the driving engagement of the drive pinion 6 with the ring gear 40. In particular, such a bearing construction has been found to adequately resist lateral deflections occurring in the flange member 38 and the wall member 42. By mounting the differential in this manner, the additional structural elements required to incorporate the multiple disc clutch therein may be conveniently employed in a differential housing of normal size.

Having shown but one specific form of a differential, it is to be understood nevertheless that this invention is not to be limited to the specific form illustrated but only by the scope of the claims which follow. In particular, while the employment of this invention in heavy duty vehicles is specifically contemplated, it will be obvious that broader aspects of the invention are equally applicable to conventional motor vehicles.

I claim:

1. In combination, a differential housing having oppositely disposed openings therein and including a pilot portion extending into the interior of said housing, coaxial wheel-driving shafts extending from the interior of said housing through said openings, driving means extending into the interior of said housing, driven means connected to said driving means and including a differential drive mechanism, said differential drive mechanism including a differential cage rotatably mounted on the axis of said shafts, means for supporting one end of said cage including bearing means interposed between said cage and said housing, differential gear means including meshing differential pinion and side gears within said cage, said side gears being secured respectively to said shafts, a clutch housing secured to said driven means and including an annular wall axially spaced from said driven means, said wall including a portion bearing on said housing pilot portion, and further including a portion radially inwardly spaced from said housing pilot portion and surrounding one of said shafts, bearing means interposed between said last-named wall portion and housing pilot portion, a multiple disc clutch in said housing, said clutch comprising relatively axially movable disc elements certain of which are operatively secured for rotation with said driven means and certain of which are operatively secured to one of said side gears, an annular piston disposed between said clutch and housing wall and defining with the latter a fluid pressure chamber, and fluid pressure means for applying said piston to said clutch discs to lock said differential.

2. In combination, a differential housing having oppositely disposed openings therein and including a pilot portion extending into the interior of said housing, coaxial wheel-driving shafts extending from the interior of said housing through said openings, driving means extending into the interior of said housing, driven means connected to said driving means and including a differential drive mechanism, said differential drive mechanism including a differential cage rotatably mounted on the axis of said shafts, means for supporting one end of said cage including bearing means interposed between said cage and said housing, differential gear means including meshing differential pinion and side gears within said cage, said side gears being secured respectively to said shafts, a clutch housing secured to said driven means and including an annular wall axially spaced from said driven means, said wall including a portion bearing on said housing pilot portion, and further including a portion radially inwardly spaced from said other housing pilot portion and surrounding one of said shafts, bearing means interposed between said last named wall portion and housing pilot portion, a multiple disc clutch in said housing, said clutch comprising a first set of relatively axially movable clutch discs secured to said driven means for rotation therewith, a second set of relatively axially movable clutch discs interleaved between said first set and secured to said one shaft for rotation therewith, an annular piston disposed between said clutch and housing wall and defining with the latter a fluid pressure chamber, fluid pressure means for applying said piston to said clutch discs to lock said differential, said means comprising a source of fluid under pressure, conduit means connecting said source to said chamber, and manually controlled valve means in said conduit for selectively connecting said chamber with said source or an exhaust outlet in said valve.

3. In combination, a differential housing having oppositely disposed openings therein and including an annular pilot portion surrounding one of said openings and extending into the interior of said housing, coaxial wheel-driving shafts extending from the interior of said housing through said openings, driving means extending into the interior of said housing, driven means connected to said driving means and including a differential drive mechanism, said differential drive mechanism including a differential cage rotatably mounted on the axis of said shafts, means for supporting one end of said cage including bearing means interposed between said cage and said housing, differential gear means including meshing differential pinion and side gears within said cage, said side gears being secured respectively to said shafts, a clutch housing secured to said driven means and including an annular wall axially spaced from said driven means, said wall including an annular peripheral portion bearing on said housing pilot portion, and further including an axially outwardly projecting portion radially inwardly spaced from said housing pilot portion and surrounding one of said shafts, bearing means interposed between said last-named wall portion and housing pilot portion, a multiple disc clutch in said housing, said clutch comprising a first set of relatively axially movable clutch discs secured to said driven means for rotation therewith, a second set of relatively axially movable clutch discs interleaved between said first set and secured to said one shaft for rotation therewith, an annular piston disposed between said clutch and housing wall and defining with the latter a fluid pressure chamber, fluid pressure means for applying said piston to said clutch discs to lock said differential, said means comprising a source of fluid under pressure, conduit means connecting said source to said chamber, and manually controlled valve means in said conduit for selectively connecting said chamber with said source or an exhaust outlet in said valve.

4. In combination, a differential housing having oppositely disposed openings therein and including annular pilot portions surrounding said openings and extending into the interior of said housing, coaxial wheel-driving shafts extending from the interior of said housing through said openings, driving means extending into the interior of said housing, driven means connected to said driving means and including a differential drive mechanism, said differential drive mechanism including a differential cage rotatably mounted on the axis of said shafts, means for supporting one end of said cage including bearing means interposed between said cage and one of said housing pilot portions, differential gear means including meshing differential pinion and side gears within said cage, said side gears being secured respectively to said shafts, a clutch housing secured to said driven means and including an annular wall axially spaced from said driven means, said wall including an annular peripheral portion bearing on the other of said housing pilot portions, and further including an axially projecting portion radially inwardly spaced from said other housing pilot portion and surrounding the other of said shafts, bearing means interposed between said last-named wall portion and housing pilot portion, a multiple disc clutch in said housing, said clutch comprising a first set of relatively axially movable clutch discs secured to said driven means for rotation therewith, a second set of relatively axially movable clutch discs interleaved between said first set and secured to said other shaft for rotation therewith, an annular piston disposed between said clutch and housing wall and defining with the latter a fluid pressure chamber, fluid pressure means for applying said piston to said clutch discs to lock said differential, said means comprising a source of fluid under pressure, conduit means connecting said source to said chamber, and manually controlled valve means in said conduit for selectively connecting said chamber with said source or an exhaust outlet in said valve.

5. In combination, a differential housing, oppositely disposed openings in said housing, annular pilot portions of said housing surrounding said openings and extending into said housing, driving means extending into said housing, driven means connected to said driving means and including a differential cage disposed between said openings in said housing, oppositely disposed differential gears rotatably mounted in said cage, oppositely disposed side gears in mesh with said differential gears, coaxial wheel-driving shafts secured to said side gears and projecting in opposite directions through said housing openings, said cage having an annular support portion surrounding one of said shafts, bearing means interposed between said cage support portion and the pilot portion of the associated housing opening, a clutch housing secured to said driven means and including an annular wall outwardly spaced from said driven means, said wall including an annular peripheral portion bearing on the pilot portion of the other of said housing openings, and a support portion surrounding the other of said shafts, bearing means interposed between said shaft-surrounding wall portion and said last named pilot portion, a multiple disc clutch in said housing, said clutch comprising a first set of relatively axially movable discs secured to said driven means for rotation therewith, a second set of relatively axially movable discs interleaved between said first set and secured to said other shaft for rotation therewith, an annular piston disposed between said clutch and housing wall and defining with the latter a pressure chamber, fluid pressure means for applying said piston to said clutch discs to lock said differential, said means comprising a source of fluid under pressure, conduit means connecting said source to said chamber, and manually controlled valve means in said conduit for selectively connecting said chamber with said source or an exhaust outlet in said valve.

6. In combination, a differential housing having oppositely disposed openings therein and including a pilot portion extending into the interior of said housing, coaxial wheel-driving shafts extending from the interior of said housing through said openings, driving means extending into the interior of said housing, driven means connected to said driving means and including a differential drive mechanism, said differential drive mechanism including a differential cage rotatably mounted on the axis of said shafts, means for supporting one end of said cage including bearing means interposed between said cage and said housing, differential gear means including meshing differential pinion and side gears within said cage, said side gears being secured respectively to said shafts, a clutch housing secured to said driven means and including an annular wall axially spaced from said driven means, said wall including a portion bearing on said housing pilot portion, and further including a portion radially inwardly spaced from said housing pilot portion and surrounding one of said shafts, bearing means interposed between said last-named wall portion and housing pilot portion, a multiple disc clutch in said housing, said clutch comprising an annular clutch plate having its inner periphery splined to said one shaft and its outer periphery terminating radially inwardly from the inner wall of said clutch housing, relatively axially movable disc elements certain of which are operatively secured for rotation with said clutch housing inner wall and certain of which are operatively secured to the outer periphery of said clutch plate, an annular piston disposed between said clutch and annular housing wall and defining with the latter a fluid pressure chamber, and fluid pressure means for applying said piston to said clutch discs to lock said differential.

References Cited in the file of this patent

UNITED STATES PATENTS

| 1,791,198 | Focher | Feb. 3, 1931 |
| 2,669,330 | Banker | Feb. 16, 1954 |
| 2,768,538 | Simonds | Oct. 30, 1956 |

FOREIGN PATENTS

| 591,958 | Germany | Jan. 30, 1934 |
| 780,866 | France | Feb. 11, 1935 |